Patented Dec. 29, 1942

2,306,776

UNITED STATES PATENT OFFICE 2,306,776

PROCESS OF TREATING VITAMINIFEROUS MATERIALS

Loran O. Buxton, Harrison, N. J., assignor to National Oil Products Company, Harrison, N. J., a corporation of New Jersey No Drawing. Application August 30, 1938, Serial No. 227,599

9 Claims. (Cl. 167—81)

The invention relates in general to the purification of fat-soluble vitamin-containing materials and in particular to a process of improving the taste, odor and color of vitamin-bearing oils and concentrates thereof.

Since the discovery of vitamins a few years ago, their value and vital relationship with respect to the well being of mankind and animal life in general has become more apparent with the passage of time. Considerable research has been conducted with respect to the isolation and purification of the fat-soluble and other naturally-occurring vitamins. The chief natural sources of the fat-soluble vitamins are found in various oils, particularly fish liver oils. The vitamin content or potency of these oils varies according to the quality and particular species of fish treated, as well as according to the processes employed in recovering the oil. In many cases the potency of the oils is increased by freeing the same of saponifiable matter by alkali treatment or by extracting the unsaponifiable from the saponifiable matter. So-called high potency oils or vitamin concentrates are thus obtained according to the degree to which the aforementioned processes are carried out. In any event, the original oil, high potency oil or concentrate derived therefrom are each characterized by possessing an obnoxious taste and odor, as well as a dark color, each of which greatly detracts from the value thereof. Many proposals have been made in an attempt to overcome these undesirable properties, but as yet no successful commercial process has been developed which will not seriously affect the vitamin potency. Vitamin A in particular is highly sensitive to oxygen and to various treatments and great care must be exercised in handling products containing the same.

A proposal has been made to deodorize and decolorize vitamin concentrates by dissolving the same in a suitable solvent and percolating the solution through a column or the like containing an animal or vegetable carbon or an earth while maintaining the system flooded with carbon dioxide. In this process the use of an antioxidant such as hydroquinone or pyrogallol is essential to protect the vitamins A and D against oxidation. While this process has displayed a slight degree of merit on a laboratory scale, it is unapplicable for commercial production. Moreover, the use of an antioxidant is highly undesirable as it renders the process cumbersome and costly. Further, it has been found that the antioxidant does not function any too well in its role of protecting the vitamins against destruction by oxidation.

The general object of the invention is to obviate the foregoing and other disadvantages.

A specific object of the invention is to provide an improved process of decolorizing, deodorizing and improving the taste of fat-soluble vitamin-containing substances by the use of activated animal and/or vegetable carbons.

Another object of the invention is to provide a process of purifying vitamin A and D-containing substances without the use of inert gases and antioxidants for the protection of the vitamins.

A further object of the invention is to provide an improved process of removing impurities from vitamin-containing oils and concentrates thereof by the use of activated carbons, which is adapted for practice in large batch commercial production.

Other objects of the invention will in part appear obvious and will in part appear hereinafter.

It has now been found that the foregoing and other objects of the invention may be realized by the following process which comprises admixing a fat-soluble vitamin-containing material with a completely deaerated mixture of an animal or vegetable carbon and an organic solvent for the fat-soluble vitamin-containing material and separating the thus purified fat-soluble vitamin-containing material from the carbon by means of filtration, centrifuging or the like. The carbon-solvent mixture may be deaerated by merely stirring the two together in a vessel with or without the aid of heat. After the fat-soluble vitamin-containing material has been admixed with the carbon-solvent mixture, stirring or a similar means of agitation should be resorted to with or without the aid of heat. The solvent will slowly volatilize thus providing an air-free zone above the surface of the mixture, whereby oxidation of the constituents thereof is inhibited.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, any suitable animal or vegetable carbon may be employed, examples of which include, inter alia, the following well-known products available on the market under the trade names of "Nuchar XXX," "Nuchar #2," "Nuchar 000," "Nuchar Aqua," "Nuchar C-145," "Nuchar Wa," "Darco 60," "Darco 90," "Darco K," etc. The foregoing and other similar products may be used alone or in combination with each other, as well as in combination with colloidal clays, earths, etc. Likewise, in certain cases a filter-aid may also be used to facilitate filtration of the purified fat-soluble vitamin-containing product, although the use of colloidal clay with an animal or vegetable carbon renders the use of a filter-aid unnecessary.

Any suitable solvent may be used which will dissolve or appropriately serve as a vehicle for the fat-soluble vitamin-containing material during the treatment with the carbons of the aforementioned type. Suitable solvents include, among others, heptane, ethylene dichloride, trichlorethylene, dichlorethylether, ethyl ether, chloroform, acetone, isopropanol, petroleum ether, cyclohexane, dioxane, methanol, etc., the first three named solvents being highly preferred.

After selection of the activated carbon or combination of carbons and/or clays, earths, etc. and the solvent or mixture of solvents to be used in the process, the most important step follows. Upon admixture of the purifying substances with the solvent, the step of deaeration of the mixture is effected. The process of deaerating the mixture must be carried out with the utmost care as the success of the whole process depends upon complete deaeration of this mixture before the fat-soluble vitamin-containing material is treated therewith. The preferred procedure comprises admixing the activated carbon and the solvent in an open vessel, whereupon the mixture is stirred until the last trace of air has been eliminated. This step may be accelerated by warming the mixture and/or subjecting it to reduced pressure. When the solvent-carbon mixture has been completely deaerated and a solvent-vapor zone created over the surface of the mixture, the fat-soluble vitamin-containing material is run into the same or vice versa, the former being preferred. The fat-soluble vitamin-containing material as added may contain a solvent therefor, which should preferably be the same solvent as that used in the solvent-carbon mixture or at least one miscible therewith. The inclusion of a solvent with the fat-soluble vitamin-containing material is particularly advantageous where fish liver oils are solvent extracted to yield a vitamin oil-solvent mixture, thus obviating the usual step of separating the solvent from the oil after extraction but before refining. Stirring of the mixture is continued until the activated carbon has completed its function of adsorbing the impurities which impart the undesirable taste, odor and color to the original material. During the treatment of the fat-soluble vitamin-containing material, the vessel may remain either open or closed as far as the process is concerned because the atmosphere immediately above the mixture is substantially completely oxygen-free. It has been found that the purifying action of the activated carbon may be accelerated by heat in which event the vessel should be left open or closed depending upon the degree of heat used and the volatility of the solvent.

Upon completion of the carbon treatment, the solvent and fat-soluble vitamin-containing material may be separated from the carbon and impurities adsorbed thereby, according to known methods such as filtrating, centrifuging, decanting, etc., filtering being preferred. The filtrate may in certain cases be subjected to further treatment with carbon in the same manner set forth supra. The carbon residue may be washed with fresh solvent to remove any remaining fat-soluble vitamin-containing material. The purified fat-soluble vitamin-containing material is recovered from the solvent by distilling off the latter. The resulting vitamin-containing oil or concentrate thereof is markedly improved in color, odor and taste.

The expression "fat-soluble vitamin-containing material" is used herein to generically connote any material bearing vitamins A and/or D, as well as materials containing the remaining known vitamins. For purpose of abbreviation, the expression "F. F. A." is used herein to represent "free fatty acids." The term "units of vitamin A" is to be interpreted as the "U. S. P." units of the given vitamin. The present invention is, however, particularly concerned with the purification of animal, vegetable and marine oils or concentrates thereof rich in vitamins A and/or D, such as the liver oils obtained from cod, halibut, swordfish, sardine, pollack, herring, tuna, shark, ling cod, jew fish and other fish, as well as palm oil, oils containing carotene (provitamin A), wheat germ oil (containing vitamin E), etc. While the present process is particularly concerned with the purification of fat-soluble vitamin-containing materials of the aforementioned type, it is within the purview of the invention to employ the present process for the purification of synthetic vitamin products of the type produced by the sulfonation of cholesterol, wool grease and other similar materials.

For a fuller understanding of the nature and objects of the invention, reference should be had to the following examples which are given merely to further illustrate the invention and are not to be construed in a limiting sense, all parts being given by weight.

*Example I*

Weigh into an open vessel one part of "Nuchar XXX" and 90 parts of ethylene dichloride. Agitate moderately for five minutes or until completely deaerated and add slowly 10 parts of crude swordfish liver oil (F. F. A.—2.75% and 171,000 U. S. P. units of vitamin A per gram). Continue the stirring for 30 minutes. Add one part of filter-aid ("High Flo") and filter. Wash the residue five times with 10 part portions of ethylene dichloride. Remove the solvent by vacuum distillation in the presence of nitrogen gas. Yield oil: 10 parts.

F. F. A. _____ 2.70%
Potency _____ 170,000 units A/gm.

The color, odor and taste are greatly improved.

*Example II*

Weigh into an open vessel two parts of "Nuchar XXX" and 80 parts of heptane. Deaerate by moderate agitation for 5 minutes and add slowly 20 parts of crude sword fish oil (F. F. A. 2.75% and 171,000 units of vitamin A per gram). Continue the stirring for 30 minutes. Add two parts of filter-aid and filter. Wash the residue five times with 10 part portions of heptane. Remove the solvent by vacuum distillation in the presence of nitrogen gas. Yield: 9.8 parts.

F. F. A____ 0.2%
Potency___ 179,000 U. S. P. units of vitamin A/gm.

The product has a light yellow color, a bland taste and is odorless.

*Example III*

Weigh into a vessel one part of "Darco 60," one part of "Nuchar XXX" and 80 parts of heptane. Agitate for 5 minutes or until all air is expelled and add slowly 20 parts of crude ling cod fish liver oil (F. F. A.—less than 1% and 460,000 units of vitamin A per gram). Continue stirring for 1 hour. After all the suspended material is allowed to settle, filter the batch. Wash the residue five times with two part portions of heptane. Remove the solvent by vacuum distillation in the presence of nitrogen gas. Yield: 20 parts of oil.

F. F. A_____ Less than 1%
Potency_____ 461,000 units A/gm.

The oil is greatly improved as to odor, color and taste.

Example IV

Weigh into a container one-half part "Darco 60," one-half part "Nuchar Aqua," one-half part "Nuchar XXX," one-half part colloidal clay and 80 parts dioxane. Agitate moderately for 5 minutes to deaerate and add slowly 20 parts of crude halibut fish liver oil. (F. F. A.—less than 1%, potency 60,000 A per gram). Continue the agitation for 30 minutes. Allow to settle, filter, wash the residue five times with 20 part portions of dioxane. Remove the solvent by vacuum distillation in the presence of nitrogen gas. Yield: 20 parts oil.

F. F. A_____ Less than 1%
Potency_____ 60,000 units A/gm.

Color, taste and odor are greatly improved.

Example V

Weigh into a container one part "Nuchar #2," one part "Nuchar XXX" and 90 parts isopropanol. Warm to 50° C. and agitate for 5 minutes to deaerate. Add slowly 10 parts crude swordfish liver oil. (F. F. A.—2.75%, potency 171,000 U. S. P. units of vitamin A/gm.). Continue agitation for 1 hour. Filter and wash residue five times with 10 part portions of isopropanol. Remove solvent by vacuum distillation in presence of nitrogen gas. Yield: 10 parts oil.

F. F. A____ 2.75%
Potency___ 172,000 U. S. P. units of vitamin A/gm.

Color, taste and odor are greatly improved.

Example VI

Weigh into a container two parts "Nuchar XXX" and 90 parts methanol. Deaerate and add slowly 10 parts of high vitamin A concentrate (methanol soluble unsaponifiable fraction of fish liver oil 838,000 units vitamin A/gm.). Continue agitation for 1 hour and filter. Wash residue five times with 20 part portions of methanol. Remove solvent by vacuum distillation in presence of nitrogen gas. Yield concentrate: 10 parts, potency 835,000 units A/gm. The color, taste and odor are greatly improved.

The foregoing process has proved to be highly successful commercially, and it is far superior to the heretofore known processes which comprise passing a fat-soluble vitamin-containing material through a column of carbon or by the use of an antioxidant along with carbon. The salient feature of the invention lies in the mode of first deaerating the solvent-carbon mixture and providing intimate contact between the carbon and the solvent diluted fat-soluble vitamin-containing material. As may be noted from the specific examples given, the vitamin A completely withstands the purification process, and in some cases, particularly where heptane is used, the vitamin potency is increased due to the removal of some of the free fatty acids along with the adsorbed impurities.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent is:

1. A process of removing objectionable color, odor and taste from fat-soluble vitamin-containing materials which comprises admixing activated carbon with an organic solvent, deaerating the carbon-solvent mixture by means of agitation, adding the fat-soluble vitamin-containing material to the deaerated carbon-solvent mixture, agitating the entire mass to effect adsorption of impurities on the carbon and separating the refined fat-soluble vitamin-containing material and solvent from the carbon and impurities adsorbed thereon.

2. A process of removing objectionable color, odor and taste from fat-soluble vitamin-containing materials which comprises admixing activated carbon with an organic solvent, deaerating the carbon-solvent mixture by means of agitation, adding the fat-soluble vitamin-containing material to the deaerated carbon-solvent mixture, agitating the entire mass while heating the same to effect adsorption of impurities on the carbon and separating the refined fat-soluble vitamin-containing material and solvent from the carbon and impurities adsorbed thereon.

3. A process of removing objectionable color, odor and taste from fat-soluble vitamin-containing materials which comprises admixing activated carbon and colloidal clay with an organic solvent, deaerating the clay-carbon-solvent mixture by means of agitation, adding the fat-soluble vitamin-containing material to the deaerated clay-carbon-solvent mixture, agitating the entire mass to effect adsorption of impurities on the carbon and clay and separating the refined fat-soluble vitamin-containing material and solvent from the clay, carbon and impurities adsorbed thereon.

4. A process of removing objectionable color, odor and taste from fat-soluble vitamin-containing materials which comprises admixing activated carbon with a hydrocarbon solvent, deaerating the carbon-solvent mixture by means of agitation, adding the fat-soluble vitamin-containing material to the deaerated carbon-solvent mixture, agitating the entire mass to effect adsorption of impurities on the carbon and separating the refined fat-soluble vitamin-containing material and solvent from the carbon and impurities adsorbed thereon.

5. A process of removing objectionable color, odor and taste from fat-soluble vitamin-containing materials which comprises admixing activated carbon with a chlorinated hydrocarbon solvent, deaerating the carbon-solvent mixture by means of agitation, adding the fat-soluble vitamin-containing material to the deaerated carbon-solvent mixture, agitating the entire mass to effect adsorption of impurities on the carbon and separating the refined fat-soluble vitamin-containing material and solvent from the carbon and impurities adsorbed thereon.

6. A process of removing objectionable color, odor and taste from fish liver oils which comprises admixing activated carbon with a hydrocarbon solvent, deaerating the carbon-solvent mixture by means of agitation, adding the fish liver oil to the deaerated carbon-solvent mixture, agitating the entire mass to effect adsorption of impurities on the carbon and separating the refined fish liver oil and solvent from the carbon and impurities adsorbed thereon.

7. A process of removing objectionable color, odor and taste from fish liver oils which comprises admixing activated carbon with a chlorinated hydrocarbon solvent, deaerating the carbon-solvent mixture by means of agitation, adding the fish liver oil to the deaerated carbon-solvent mixture, agitating the entire mass to effect adsorption of impurities on the carbon and separating the refined fish liver oil and solvent from the carbon and impurities adsorbed thereon.

8. A process of removing objectionable color, odor and taste from wheat germ oil which comprises admixing activated carbon with an organic solvent, deaerating the carbon-solvent mixture by means of agitation, adding the wheat germ oil to the deaerated carbon-solvent mixture, agitating the entire mass to effect adsorption of impurities on the carbon and separating the refined wheat germ oil and solvent from the carbon and impurities adsorbed thereon.

9. A process of removing objectionable color, odor and taste from the unsaponifiable fraction of fish liver oils which comprises admixing activated carbon with an organic solvent, deaerating the carbon-solvent mixture by means of agitation, adding the unsaponifiable fraction of a fish liver oil to the deaerated carbon-solvent mixture, agitating the entire mass to effect adsorption of impurities on the carbon and separating the refined unsaponifiable fraction of fish liver oil and solvent from the carbon and impurities adsorbed thereon.

LORAN O. BUXTON.